United States Patent

Goldberg

[15] 3,643,027

[45] Feb. 15, 1972

[54] DIGITAL INFORMATION RECEIVER

[72] Inventor: Lawrence H. Goldberg, Eatontown, N.J.

[73] Assignee: The United States of America as represented by the Secretary of the Army

[22] Filed: Oct. 2, 1969

[21] Appl. No.: 863,171

[52] U.S. Cl. .......... 178/88

[51] Int. Cl. .......... H04l 15/24

[58] Field of Search .......... 178/88, 69, 69 G, 69 A, 69 B; 325/313, 323, 324, 325; 179/15 AE

[56] References Cited

UNITED STATES PATENTS 3,496,536 2/1970 Wheeler et al .......... 325/323

*Primary Examiner*—Richard Murray

*Attorney*—Harry M. Saragovitz, Edward J. Kelly, Herbert Berl and Jeremiah G. Murray

[57] ABSTRACT

A digital information receiver having an error rate detector for controlling a digital information processor. The error rate detector, connected to the discriminator output, has a wave shaper and logic gates for producing pulses for each of the transitions in the received signal. A clock signal is then gated with the transition pulses and sampled to produce a series of pulses one for each transition which occurs in synch with the clock. The rate at which these pulses occur is measured and is an indication of the error rate due to noise.

3 Claims, 3 Drawing Figures

INVENTOR.
LAWRENCE H. GOLDBERG
BY: Jeremiah G. Murray
AGENT
Harry M. Saragovitz,
Edward J. Kelly & Herbert Berl
ATTORNEYS.

INVENTOR.
LAWRENCE H. GOLDBERG

BY: Jeremiah G. Murray
AGENT

Harry M. Saragovitz,
Edward J. Kelly & Herbert Berl
ATTORNEYS.

DIGITAL INFORMATION RECEIVER

The present invention relates to improvements in digital communication systems and more particularly to a digital communication receiver.

In the field of digital communications, it has been the general practice to employ error correction devices during the processing of digital information. Those concerned with the development of digital communication systems have long recognized the need for a device that could indicate the probable error rate due to noise in a received digital signal, since error correction devices will usually operate effectively only when the error rate is below a particular threshold. The present invention fulfills this need.

The general purpose of this invention is to provide a unique error rate detector which determines the rate of those transitions in a digital signal which occur in synchronism with a clock signal, since the error rate due to noise will generally be a direct function of this rate. This error rate information is then used to control the error correction equipment by either discontinuing the processing of the information or by possibly switching from one error correcting device to another.

The exact nature of this invention as well as other objects and advantages thereof will be readily apparent from consideration of the following specification relating to the annexed drawing in which.

Figure 1:
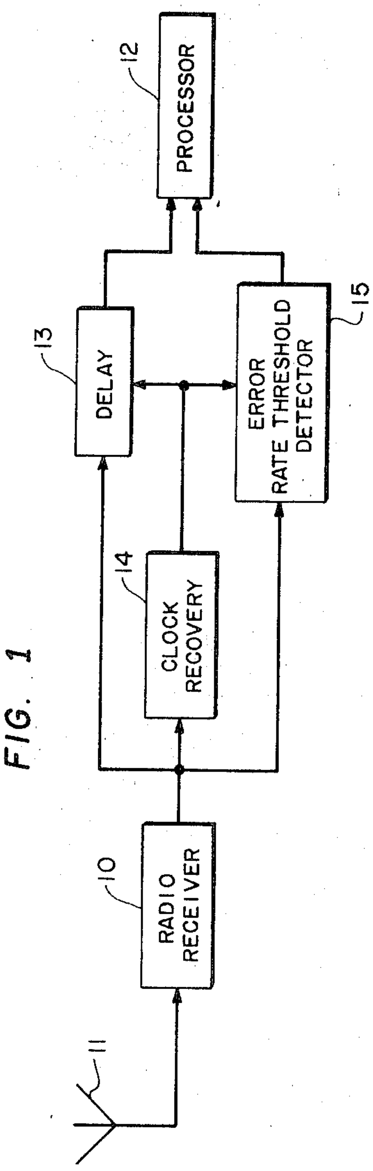
FIG. 1 is a block diagram of a preferred embodiment of the invention.

Referring now to the drawing there is shown in FIG. 1 a digital communication processing system having a radio receiver 10 for receiving RF digital information via antenna 11. The output of receiver 10 is applied to a processor 12 via a delay 13. A clock recovery device 14 and an error rate detector 15 also receive the output of receiver 10. The output of the clock recovery device 14 is applied to delay 13 and error rate detector 15. The output of error rate detector 15 is applied to processor 12.

The processing of a digital signal would start with the reception of the signal via antenna 11 and receiver 10. If the transmitted signal was frequency modulated then the output of receiver 10 would be tapped off the discriminator. This output is then applied to clock recovery device 14 in which the fundamental frequency is detected so as to generate a clock signal similar to and synchronized with the transmitter clock signal. Such devices are well known in the art. It is pointed out that synchronization may also be accomplished by a synch signal superimposed on the information signal. The output of receiver 10 is also applied to a delay 13 which will store the received signal for a short time to permit the error rate threshold detector to determine if the probable number of errors in the information stored in delay 13 is above a predetermined number. The delay 13 might, for example, include a shift register which is shifted by the output of clock recovery device 14.

After the predetermined delay, the information will then enter the processor 12 along with a signal from detector 15. Processor 12 will include a standard device for automatically correcting errors in the received bits. Also, included in processor 12 would be possibly a recorder of some standard type for recording the corrected signal. As is well known, the reliability of error correction devices is normally a function of the error rate. Above a certain error rate threshold the received signal would, in most cases, be useless even after error correction. Therefore, the signal from detector 15 which is a measure of the probable error rate due to noise could be used to turn on the processor 12 when information having an error rate below a particular threshold is being received.

Figure 2:
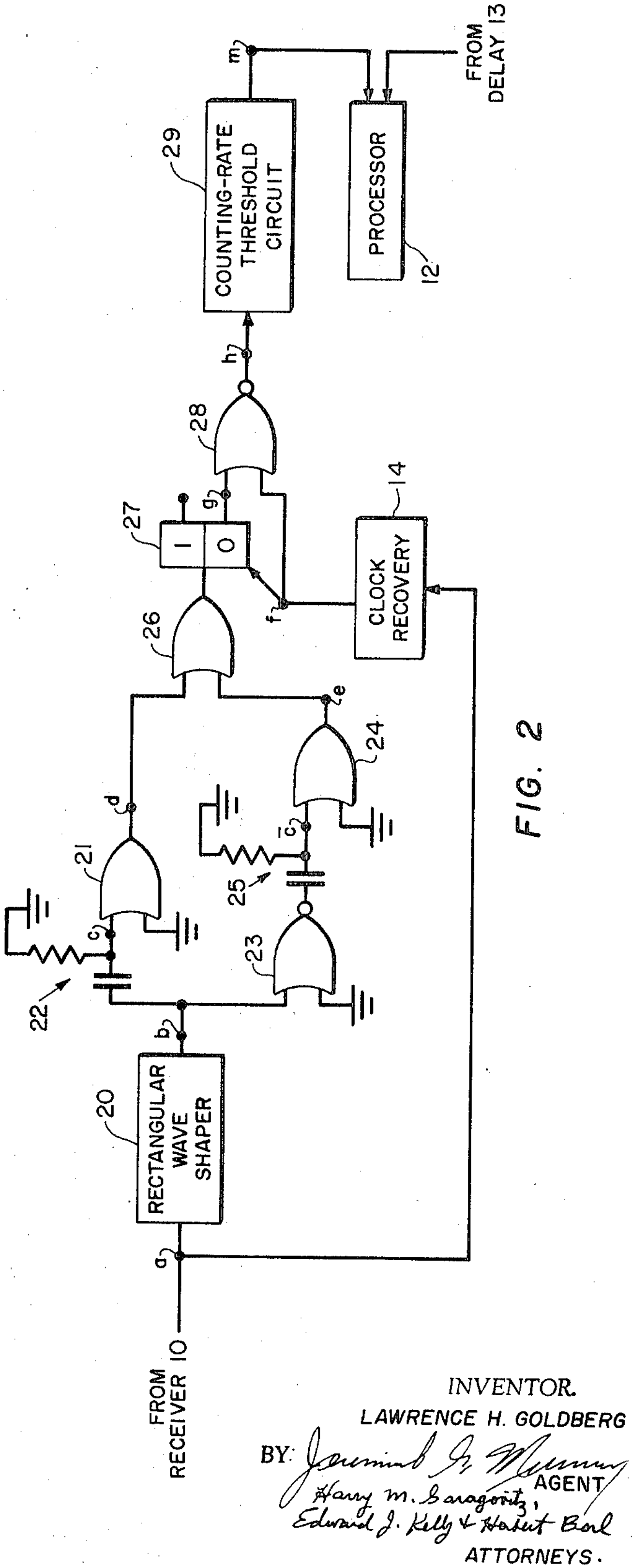
FIG. 2 is a block diagram of a portion of the device shown in FIG. 1.

FIG. 2 shows in detail error rate threshold detector 15 which has a wave shaper 20 for producing a rectangular waveform which is positive when the input goes above a particular value. Such circuits are well known and may include clippers and rectifiers. The output of wave shaper 20 is connected to one input of OR-gate 21 via RC circuit 22. The second input to OR-gate 21 is grounded. The output of wave shaper 20 is also applied to a NOR-gate 23 having one input grounded and having the output connected to one input of OR-gate 24 via RC circuit 25. The second input to OR-gate 24 is also grounded. The outputs of OR-gates 21 and 24 are connected to the inputs of OR-gate 26 the output of which is connected to a gated latch 27 which is gated by the output of clock recovery circuit 14. The output of gated latch 27 and clock 14 are connected to the inputs of NOR-gate 28, the output of which is connected to a counting-rate threshold circuit 29 which in turn is connected to the processor 12.

Figure 3:
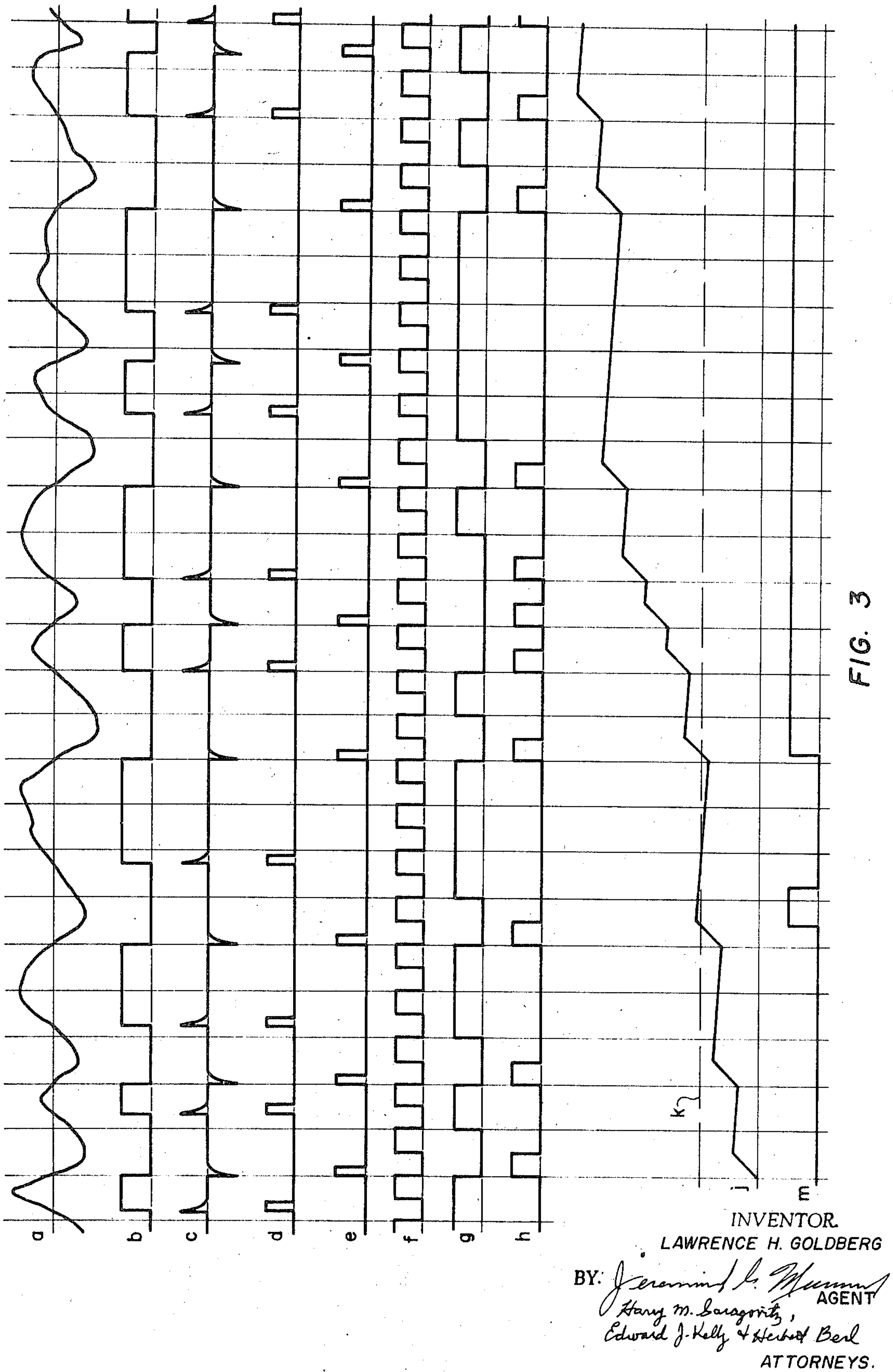
FIG. 3 is a waveform diagram helpful in explaining the device of FIG. 2.

The operation of the device of FIG. 2 will now be described with reference to the waveforms of FIG. 3. Waveform *a* represents the output of the discriminator stage of receiver 10. Waveform *a* is applied to wave shaper 20 to produce a rectangular wave *b* having transitions which occur when the output *a* goes above a predetermined value. Waveform *b* is then differentiated by RC circuit 22 to produce waveform *c* and, after inversion by NOR-gate 23, is differentiated by RC circuit 25 to produce the inverse of waveform *c*, i.e., $\bar{c}$. The outputs of OR-gates 21 and 24 then produce waveforms *d* and *e* respectively. Waveforms *d* and *e* are combined at the output of OR-gate 26 and sampled by sampler latch 27 at each of the negative going transitions of clock signal *f* to produce waveform *g* at the output thereof. Signals *f* and *g* are applied to NOR-gate 28 the output of which is represented by waveform *h* and is applied to counting-rate threshold circuit 29.

Circuit 29 includes a counting-rate meter which may include a capacitor having a short RC time constant when charged and a long RC time constant when discharged. Waveform *h* is then used to charge the capacitor of the counting-rate meter in the well-known manner shown by waveform *j*. A standard threshold device connected to this capacitor is then set to produce a voltage whenever the voltage on the capacitor goes above a value *k* to produce waveform *m*. The waveform *m* is then applied to processor 12 to control the processor in some predetermined manner as described above.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A digital communications system comprising receiver means for receiving a digital information signal; clock recovery means for generating a clock signal having a frequency equal to the bit rate of and synchronized with said digital information signal as received; delay means connected to receiver means for delaying said digital information signal for a predetermined delay time; processor means connected to said delay means for error correcting said digital information signal; error rate detector means connected to said receiver means and said clock recovery means for measuring the number of transitions in said information signal and said clock signal which occur simultaneously in said predetermined delay time; and threshold means included in said error rate detector means for generating a processor control signal when the transition number exceeds a predetermined threshold; and means for applying said processor control signal to said processor means.

2. The system according to claim 1 and wherein said error rate detector means includes a transition detector means for generating an impulse for each transition in said information signal; and a gated latch means connected to said transition detector means and said clock recovery means for sampling the output of said transition detector means at a predetermined phase of said clock signal.

3. A device for measuring the error rate in a digital signal due to transmission noise comprising transition detector means for detecting the number and time of transitions in said digital signal; clock means including means for recovering the bit rate of the digital signal as received and for generating a clock signal having the frequency equal to said bit rate and synchronized therewith; sampling means for sampling said transition detector means and for generating a pulse only for each transition which occurs in phase with the transitions of said clock signal; a counting means connected to said sampling means for generating a signal when the rate of transitions in phase with said clock exceed a predetermined level.

* * * * *